Patented Oct. 19, 1926.

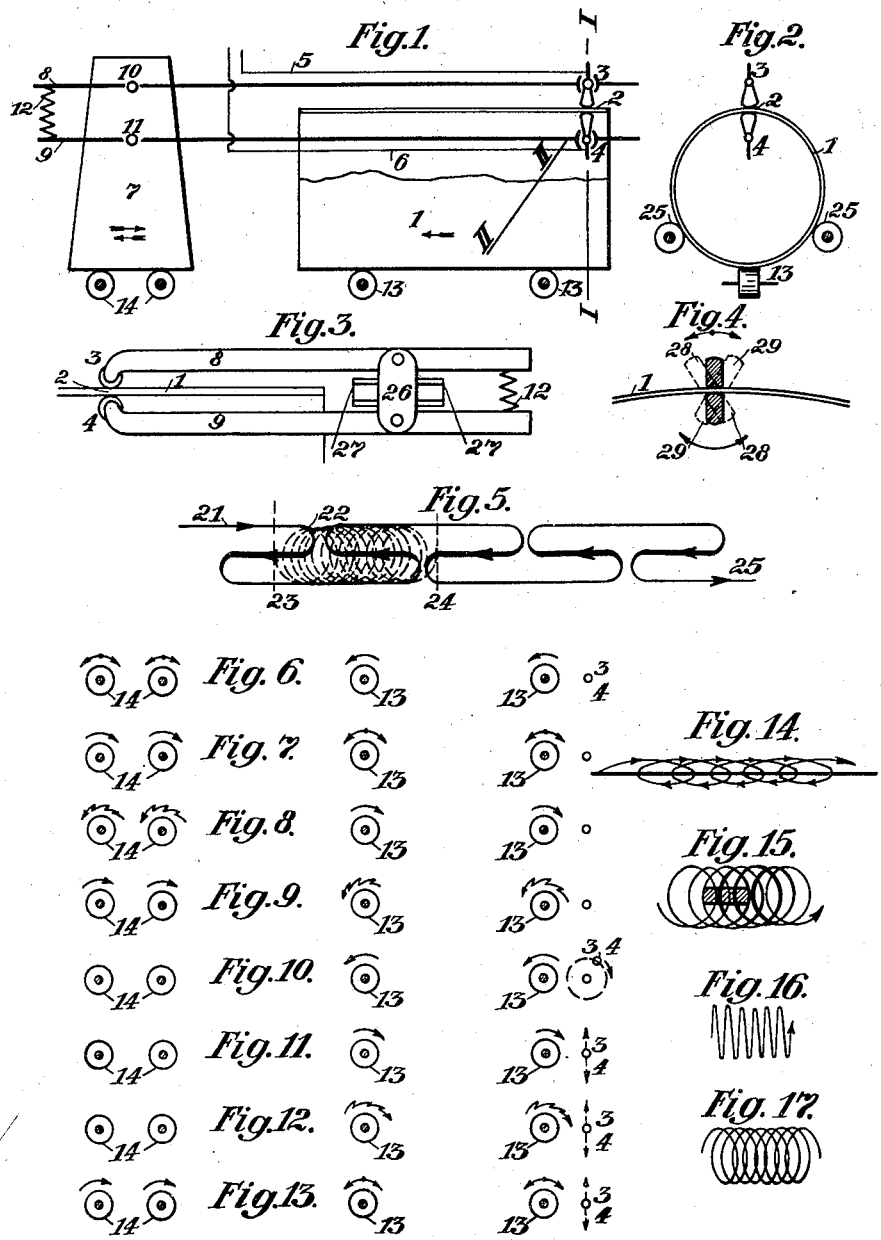

1,603,807

UNITED STATES PATENT OFFICE.

CHARLES SCHAER, OF LANGENTHAL, SWITZERLAND, ASSIGNOR TO SULZER FRÈRES SOCIÉTÉ ANONYME, OF WINTERTHUR, SWITZERLAND, A CORPORATION OF SWITZERLAND.

APPARATUS FOR RESISTANCE WELDING SHEET-METAL ARTICLES AND THE LIKE.

Application filed April 29, 1924, Serial No. 709,715, and in Germany April 30, 1923.

This invention relates to a method and apparatus for the electric resistance welding of sheet metal articles and the like of the kind in which the work is advanced or fed forwards as the welding operation proceeds.

As is well known in spot welding the material is heated to the melting temperature at the point where the heating current passes, the spot being a very limited one. Consequently the flow of the material first takes place at that spot only. As a result not only are undesirable pits and projections formed in the welded joint but further owing to the strong local heating, considerable changes of structure take place in close proximity to the joint to the great detriment of the material and its strength.

The object of the present invention is to avoid the formation of such pits or holes and injurious changes of structure in the material and to secure a uniform junction between the parts to be welded together by heating as uniformly as possible the parts to be united.

According to this invention, independently of the advance or feeding movement to which the surfaces of the parts to be heated are exposed, relative motion is caused between the work and the operating points of the electrodes during the passage of the current and means for changing the direction of said relative motion in order to move the electrodes several times over the same surface and thus to heat electrically an increased area of the work around the welding point. This additional relative movement between the work and the electrodes may be effected by moving only the electrodes, or the work alone or by moving both the work and the electrodes. In carrying the method into effect a variable speed gear or like device may be provided capable of being thrown in and out of gear at will to produce the desired movement of the electrodes, of the work or of the electrodes and the work.

The invention is diagrammatically illustrated in the accompanying drawing, in which—

Figs. 1-4 show the general structure of the device, in Fig. 5 an example of execution of the process according to the invention is compared with a previously published welding process, the so-called tube rolling (Perrins process). Figs. 6-13 show the character of the movements of the piece under treatment of a frame for the electrodes and of the electrodes themselves.

In Figs. 14-17 there is a linear diagram showing how the kinds of movement are going on, i. e., the geometrical place of the spots is shown where the current passes.

In Figs. 1, 2 and 3 the place to be heated of the work piece 1 is marked 2, the electrodes are marked 3 and 4. The current is transmitted to the electrodes by means of the conductors 5 and 6 (Fig. 1). On a frame 7, the arms 8 and 9 which support the electrodes are bedded in a rotating position in 10 and 11 and elastically connected with each other in order that the electrodes can adapt themselves to the uneven spots of the work piece. This elastic connection is represented in the drawing by a spring 12 placed between the supports 8 and 9. The rollers 13 are used for moving the work piece, whereas the rollers 14 with the frame 7 put the supports or the electrodes in motion. The electrodes themselves are provided with ball and socket joints, so that an additional motion can be carried out by the electrodes themselves, too; that means, if for instance the frame is at a standstill.

In Fig. 2 which represents a section following the line 1—1 of Fig. 1, there is another moving device as indicated which is omitted in Fig. 1 for the sake of simplicity. By means of the rollers 25 the work piece I can be put in rotary motion.

In Fig. 3 the supports 8 and 9 which are movable with the frame 7 are connected with one another by an intermediate piece 26. At the intermediate piece 26 journals 27, for instance, are provided that are finished as hexagonal ends and made from the same piece, and which are connected with a device omitted in the drawing for the sake of simplicity, that can be switched or cut out at will, in such a manner that the arms of the electrodes can carry out an oscillating motion around these journals.

As can be seen in Fig. 4, owing to this motion, the electrodes are oscillating to and fro between the positions marked 28—28 and 29—29.

Fig. 5 illustrates the difference between an example of execution of the process according to the invention and the tube rolling process. The type of movement shown by curve 21 is that of the so called tube rolling process. It is a known fact that the long strides in the tube rolling process are made without current, whereas the welding only takes place during the short strides which are marked by heavier lines in opposition to the others. At the same time, the long and the short strides always move in the same line, but in contrary directions. In opposition to this, the dotted curve 22 represents a type of motion between the electrodes and the work piece in accordance with the invention. In the known process the geometrical places of the passage of the current are always successively arranged in the direction of the forward movement. The curve 22, however, shows that in a comparative interval 23—24 the surface continually traversed by the current along the curve 22 is far greater than the surface exposed to the passage of the current in the before mentioned and known process. Besides, as far as the subject matter of the application is concerned, there is a constant passage of current.

Some kinds of execution for the production of the required and necessary movements will be explained by means of the figures. The devices described later on for carrying out the process can be switched in and out.

According to Fig. 6, the feeding motion is transmitted to the work piece by the rollers 13, while the frame 7 carries out with the supporting arms an additional advancing and receding motion. The electrodes 3 and 4 are opposite the supporting arms in a state of rest. If a uniform rotary motion is imparted to the rollers 13, for instance, according to Fig. 6, but an oscillating motion around their revolving axles to the rollers 14, the work piece carries out a uniform progressive feeding motion, whereas the electrodes are given an additional advancing and receding motion slipping over the places to be heated, the electrodes being, however, in a state of rest opposite the supporting arms. It is, however, possible, too, as shown in illustration 7, to impart the feeding motion to the frame 7 with the supporting arms and the additional motion to the work piece 1, the electrodes being again in a state of rest opposite the supporting arms.

According to Fig. 8 it is also possible to impart through the rollers 13 a uniformly progressive motion to the work piece, and through the rollers 14 an additional advancing and receding progressive motion to the frame 7. Of course, the motions imparted to the rollers 13 and 14 can also be exchanged according to the kind of execution corresponding to Fig. 9, and in this manner the feeding motion can be imparted to the frame and the additional motion to the work piece, the electrodes being left in a relative state of rest opposite the supporting arms.

Fig. 14 shows the approximate course of the motion between electrodes and work piece for a seam running in a straight direction, if the same or the frame 7 is given the motion indicated in Figs. 6–9, by a device that can be switched and cut out. It appears in Fig. 14 that the surface of the parts to be heated which is exposed to the passage of the current is greatly increased by the relative smallness of the feeding motion in comparison with the general motion produced.

According to Fig. 10, if the frame 7 is in a state of rest, the feeding motion is imparted to the work piece, and the additional motion is transmitted to the electrodes. The electrodes are put into circling motion by means of some device that can be switched and cut out, and which is not recorded in the drawing for the sake of simplicity, along the lines of the dotted line that appears in Fig. 10. The final effect remains the same, if the feeding motion is imparted to the frame 7, while the work piece is in a state of rest, and the electrodes again carry out the additional circling motion. In the last two cases a motion will arise between the work piece and the electrodes which follows the curve Fig. 15. For the sake of comparison the surface exposed to heating has been hatched in the drawing at the spot welding. From this it can be seen that in this example of execution of the process, also, the surface exposed during the same time to the passage of the current and characterized by the heavy drawn out lines, is many times greater than the one quoted for comparison. Moreover, the curves Fig. 15 show that the direction of the motion produced between the electrodes and the work piece is constantly changing.

In Fig. 11 the arrangement has been made in such a manner that while the frame 7 is in a state of rest, the work piece assumes the feeding motion, and that the additional motion is carried out by the electrodes in the shape of a motion oscillating to and fro and running at right angles to the feeding motion. The motion resulting from this combination has a zigzag form and is illustrated in Fig. 16. In the example of execution according to Fig. 12, an advancing and receding and progressive motion is imparted to the work piece while the frame 7 is in a state of rest, in such a way that the geometrical place of the spots where the current passes shows the shape of the curve represented in Fig. 17.

In the arrangement corresponding to Fig. 13 a uniformly progressive feeder motion is imparted to the frame 7, and advancing and receding motion is transmitted to the work piece, and a further advancing and receding motion running at right angles to the feeder motion is carried out by the electrodes. The geometrical place of the state of motion created in this manner between the electrodes and the work piece corresponds in its general shape also to the curve represented in Fig. 17 in which, in proportion to the extent of the individual speeds the loops are drawn closer together or farther apart. In this curve it is again to be seen that the surface exposed to the passage of the current is far greater than in the mentioned well known example of spot welding process (Fig. 15). One more combination for the execution of the process is the following:

The feeder motion is imparted to the work piece 1 as a uniformly progressive motion. A first aditional motion, for instance an advancing and receding one, is carried out by the frame 7, whereas a second additional motion is imparted to the supporting arms, while an oscillating motion is imparted to the same (according to Figs. 3 and 4), the electrodes being in a state of rest opposite the supporting arms.

The process can also be used in a manner similar to the one described for the heating of work pieces along a round seam or along any optional curve. For heating a round seam or a curve that takes any optional course, it is necessary to transmit in a rational manner the motions necessary for the longitudinal seam.

Let us explain by means of Figs. 1 and 2 an example that serves this point. If the work piece 1 is to be heated on the line II—II (Fig. 1) it will be advantageous to derive the corresponding feeder motion from a motion simultaneously imparted to one of the rollers 13 and 25, (Fig. 2) and to leave the additional motion to the electrodes. This additional motion is imparted to the electrodes in such a manner that the motion created between the electrodes and the work piece at the place to be heated will correspond to the curves shown in Figs. 14-17.

In opposition to the spot welding in which the current traverses for some length of time at one spot only, the place of the passage of the current is constantly changed in the example described. The heating also does not take place as it does in the roller motion process between the fixed electrodes, but between the moved electrodes, that is, while a motion takes place between the electrodes and the work piece. The supply of current is continual and not occasional. By the motions generated during the passage of the current between the electrodes and the work piece the result is obtained that a far greater surface is to be taken into consideration for the passage of the current than is the case in the processes so far known, and that the heating is not only extended to the place to be welded, but also to the immediate surroundings of the same In this way a better balance of the temperature is attained in the parts traversed by the current.

The state of motion existing between the electrodes and the work piece can, of course, also be attained in more ways than described in the examples. Moreover, the heating can be effected with more than one pair of electrodes.

I claim:

1. In a machine for electric resistance welding of sheet metal articles and the like, the combination of one pair of movable electrodes, means causing independently of the advance or feeding movement relative motion between the work and the operating points of said electrodes during the passage of the current, and means for changing the direction of said relative motion in order to move said electrodes several times over the same surface and thus to heat electrically an increased area of the work around the welding point.

2. In a machine for electric resistance welding of sheet metal articles and the like, the combination of one pair of movable electrodes, said electrodes being journaled in two arms or supports pivoted on a movable frame, means causing independently of the advance or feeding movement relative motion between the work and the operating points of said electrodes during the passage of the current, and means for changing the direction of said relative motion in order to move said electrodes several times over the same surface and thus to heat electrically an increased area of the work around the welding point.

3. In a machine for electric resistance welding of sheet metal articles and the like, the combination of one pair of movable electrodes, said electrodes being journaled in two arms or supports pivoted on a frame and adapted to oscillate, means causing independently of the advance or feeding movement relative motion between the work and the operating points of said electrodes during the passage of the current, and means for changing the direction of said relative motion in order to move said electrodes several times over the same surface and thus to heat electrically an increased area of the work around the welding point.

4. In a machine for electric resistance welding of sheet metal articles and the like, the combination of one pair of movable electrodes, said electrodes being journaled in two arms or supports pivoted on a frame, an intermediate piece between said arms, journals on said intermediate piece, means in operative connection with said journals to oscillate said arms, further means causing independently of the advance or feeding movement relative motion between the work and the operating points of said electrodes during the passage of the current, and means for changing the direction of said relative motion in order to move said electrodes several times over the same surface and thus to heat electrically an increased area of the work around the welding point.

5. In a machine for electric resistance welding of sheet metal articles and the like, the combination of one pair of movable electrodes, means to oscillate said electrodes in a direction transverse to the welding direction, said electrodes being journaled in two arms or supports pivoted on a frame, an intermediate piece between said arms, journals on said intermediate piece, means in operative connection with said journals to oscillate said arms, further means causing independently of the advance or feeding movement relative motion between the work and the operating points of said electrodes during the passage of the current, and means for changing the direction of said relative motion in order to move said electrodes several times over the same surface and thus to heat electrically an increased area of the work around the welding point.

6. In a machine for electric resistance welding of sheet metal articles and the like, the combination of one pair of movable electrodes, said electrodes being journaled in two arms or supports pivoted on a movable frame, an intermediate piece between said arms, journals on said intermediate piece, means in operative connection with said journal to oscillate said arms, means to rotate the work and further means to remove the work in order to move said electrodes several times over the same surface and thus to heat electrically an increased area of the work around the welding point.

7. In a machine for electric resistance welding of sheet metal articles and the like, the combination of one pair of movable electrodes, said electrodes being journaled in two arms or supports pivoted on a movable frame, an intermediate piece between said arms, journals on said intermediate piece, means in operative connection with said journals to oscillate said arms, rollers to rotate the work, rollers to remove the work, means to drive the said rollers in order to move said electrodes several times over the same surface and thus to heat electrically an increased area of the work around the welding point.

8. In a machine for electric resistance welding of sheet metal articles and the like, the combination of several pairs of electrodes movably journaled in two arms or supports, said supports being movably pivoted on a frame and connected by an intermediate piece provided with journals, said journals being operatively connected with means adapted to rotate said journals and oscillate said arms or supports, means to remove said frame, means to rotate the work, and means to remove the work in order to move said electrodes several times over the same surface and thus to heat electrically an increased area of the work around the welding point.

9. A machine for electric resistance welding of sheet metal articles and the like, the combination of at least one pair of electrodes, means causing independently of the advance or feeding movement relative motion between the work and the operating points of the electrodes during the passage of the current in order to heat electrically an increased area of the work around the welding point and special means comprising a device for producing mechanically a relative movement between the work and the electrodes without interrupting the passage of the current between the electrodes and irrespective of the resistance offered to the passage of the current by the work.

In testimony whereof I have affixed my signature.

CHARLES SCHAER